(12) United States Patent
Cortner, Jr.

(10) Patent No.: US 7,156,053 B2
(45) Date of Patent: Jan. 2, 2007

(54) INSECTICIDE APPLICATOR AND METHOD FOR LIVESTOCK

(76) Inventor: William C. Cortner, Jr., 2724 NE. State Route E, Maysville, MO (US) 64469

( * ) Notice: Subject to any disclaimer, the term of this patent is extended or adjusted under 35 U.S.C. 154(b) by 0 days.

(21) Appl. No.: 10/779,916

(22) Filed: Feb. 17, 2004

(65) Prior Publication Data

US 2006/0070583 A1 Apr. 6, 2006

(51) Int. Cl.
*A01K 13/00* (2006.01)

(52) U.S. Cl. .................... 119/662; 119/651; 119/656

(58) Field of Classification Search ................ 119/651, 119/652, 656, 661, 662, 672
See application file for complete search history.

(56) References Cited

U.S. PATENT DOCUMENTS

| | | | | |
|---|---|---|---|---|
| 3,167,055 A | * | 1/1965 | McLaughlin | 119/656 |
| 3,364,900 A | * | 1/1968 | Knapp | 119/661 |
| 3,902,461 A | * | 9/1975 | Cortner, Jr. | 119/661 |
| 4,074,659 A | * | 2/1978 | Mowbray et al. | 119/662 |
| 4,091,767 A | * | 5/1978 | Montgomery | 119/652 |
| 5,447,122 A | | 9/1995 | Cortner | |
| 5,666,906 A | * | 9/1997 | Moore et al. | 119/672 |
| 6,230,660 B1 | * | 5/2001 | Greeson | 119/656 |

\* cited by examiner

*Primary Examiner*—Teri Pham Luu
*Assistant Examiner*—Elizabeth Shaw
(74) *Attorney, Agent, or Firm*—J. David Wharton; Stinson Morrison Hecker LLP

(57) ABSTRACT

An animal insecticide applicator is presented. The applicator includes a bag for holding a quantity of insecticide, the bag having a top, two sides and a bottom. The bag is formed of a first layer of coarse mesh material through which powder insecticide can pass. A rigid tubular support is coupled with and extends across the top of the bag. A first tie rope is secured to and extends at least partially across a first side of the bag and then through the tubular support in a first direction. This tie rope terminates in a length which is hanging free at a second side of the bag. The second tie rope is secured to and extends at least partially along the second side of the bag. This tie rope is passed through the tubular support in the opposite direction of the first tie rope and includes the length hanging free at the first side of the bag. In one embodiment the applicator also includes couplers for joining two identical bags together.

9 Claims, 2 Drawing Sheets

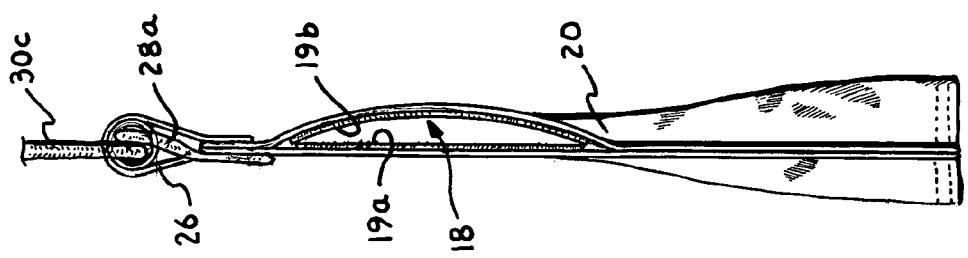
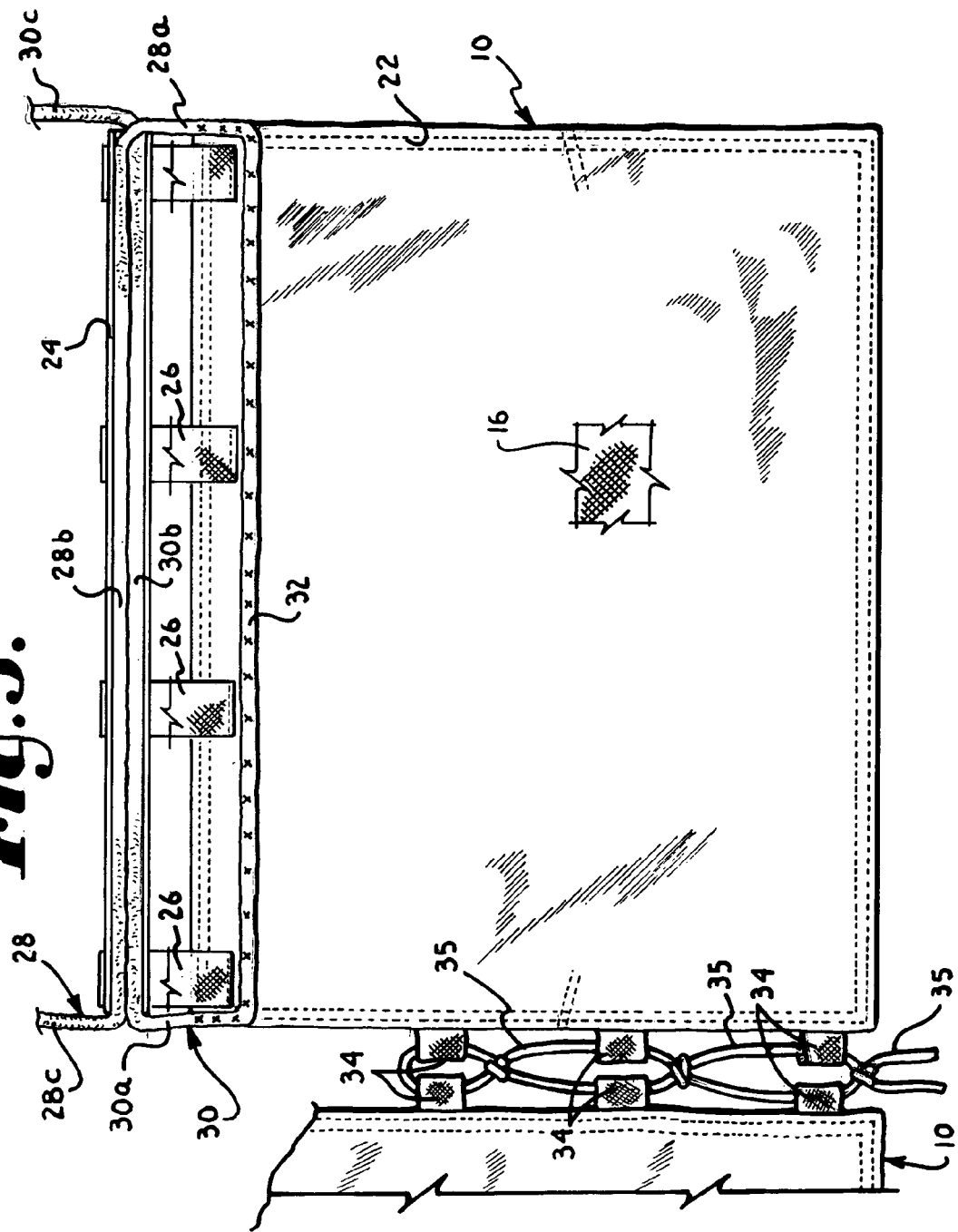

US 7,156,053 B2

INSECTICIDE APPLICATOR AND METHOD FOR LIVESTOCK

CROSS-REFERENCE TO RELATED APPLICATIONS

Not Applicable.

STATEMENT REGARDING FEDERALLY SPONSORED RESEARCH OR DEVELOPMENT

Not Applicable.

This invention relates generally to insecticide applicators for livestock and, more particularly, to an improved applicator and method which enhances the application rate and therefore the effectiveness of powdered insecticide for livestock.

BACKGROUND OF THE INVENTION

1. Field of the Invention

Self applicators for livestock insecticide have been known for decades. An early generation of self applicators took the form of "oilers" where a liquid insecticide in an oil base was applied to an absorbent material and domestic livestock would rub against the device to obtain the benefit of reducing the number of insecticides on the animal.

2. Description of Related Art

More recently, self applicators have taken the form of dust bags in which powder insecticide is placed and the dust bag will discharge the powder insecticide when an animal rubs against it. There are numerous advantages to the powdered insecticide including it is easier to protect against weather, it is safer to handle, and needs replenishing less frequently than the older "oilers."

BRIEF SUMMARY OF THE INVENTION

The present invention provides an improved insecticide applicator and method of securing an insecticide applicator from an overhead support which has improved stability and is less subject to adverse deformation than prior insecticide applicators. Alternatively, a single bag may be hung from an overhead support in an unrestricted area, such as around water tanks, salt feeders and mineral feeders for so called "free choice" use by the animal. The advantages achieved by the novel tie arrangement are attributable to a rigid tubular support to which the bag is coupled and two tie ropes which extend from opposite sides of the bag through the tubular support and are then secured to an overhead structure.

OBJECTS OF THE INVENTION

It is an objective of the present invention to provide a dust bag and method of securing a dust bag for application of insecticide to domestic livestock which includes a novel way of hanging the insecticide applicator from an overhead structure.

It is also an object of this invention to provide an insecticide applicator including a support for the applicator which, together with two tie ropes greatly reduces the opportunity for the bag to "bunch up" or otherwise be adversely distorted.

Another one of the aims of this invention is to provide an insecticide applicator which accommodates a greater flow of powder insecticide from the bag to the animal and therefore improves the efficiency of the insecticide on insects which host on the animal.

Another objective of this invention is to provide an insecticide applicator which can be joined in side by side relationship with other applicators of the same configuration so that an opening of any width may be completely blocked and there is no possibility of the animal passing between adjacent applicators and thus avoiding the insecticide.

Other objects of the invention will be made clear or become apparent from the following description and drawings;

BRIEF DESCRIPTION OF THE DRAWINGS

FIG. 2 is a side elevational view, with portions shown in cross-section, of the dust bag shown in FIG. 1;

FIG. 3 is an enlarged front elevational view, again with portions broken away, of two dust bags of the type shown in FIG. 1 for a "forced use" application.

DETAILED DESCRIPTION OF PREFERRED EMBODIMENT

Figure 1:
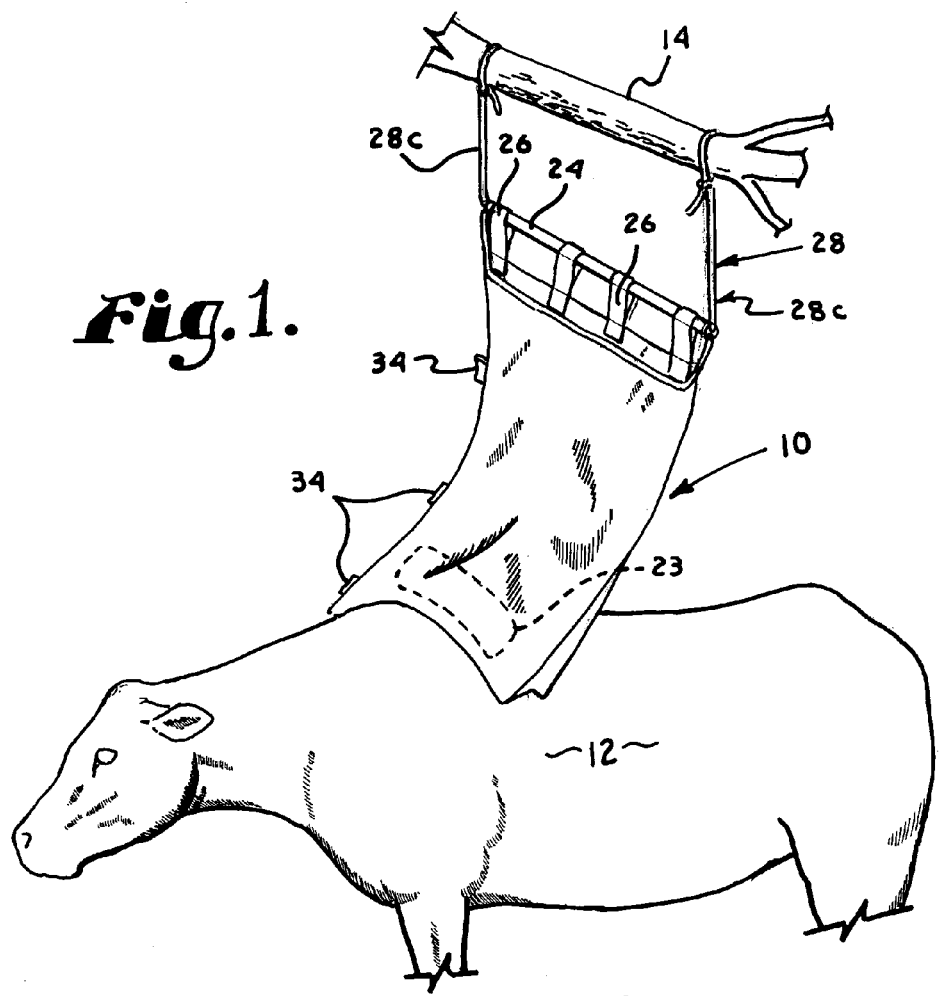
FIG. 1 is a partially schematic perspective view of a dust bag applicator according to the present invention shown hanging from an overhead tree limb with a cow passing underneath for "free choice" application of insecticide.

Referring initially to FIG. 1, an insecticide applicator in the form of a dust bag is designated generally by the numeral 10. Dust bag 10 is used for applying powder insecticide to a domestic animal 12. Dust bag 10 is hung from an overhead structure such as tree limb 14.

Referring to FIGS. 2 and 3, details of the dust bag 10 are shown and will be described. Dust bag 10 includes an inner layer of coarse mesh 16, such as burlap, which forms a compartment 18 with an opening at the top of the bag which is closed by Velcro strips 19a and 19b. Compartment 18 extends to the bottom of the bag and the mesh 16 is coarse enough to allow insecticide to pass out the bottom. The mesh layer 16 is covered by a water resistant layer 20 to protect the insecticide within the compartment from rain and other elements and also ensuring that the insecticide will only pass through the outlet at the bottom of the bag. Bag 10 is characterized by stitching 22 around its periphery which holds the two layers 16 and 18 as well as the two sides of the bag together. The insecticide is typically contained in a plastic cartridge 23 which can be easily perforated just before installation.

A tubular support 24 extends across the top of bag 10 and is coupled with the bag by a plurality of straps 26. Each of the four straps 26 is secured to bag 12 through appropriate stitching. As is apparent from viewing FIG. 2, each strap forms a loop which extends around tubular support 24.

A first tie rope designated generally by the numeral 28 includes a vertical stretch 28a which is stitched to one side of bag 10, a horizontal stretch 28b which passes through tubular support 24 and a tie stretch 28c which comprises that portion of the rope which projects from the far end of the tubular support 24. A second tie rope designated generally by the numeral 30 includes a vertical stretch 30a which is stitched to the side of bag 10 which is opposite stretch 28a, a horizontal stretch 30b which passes through tubular support 24 in the opposite direction from horizontal stretch 28*b* and a tie stretch 30*c* which comprises that portion extending from the end of tubular support 24. A connecting link 32 extends across the top of bag 12 and is integral with tie ropes 28 and 30 so as to form a continuous length of rope which incorporates both.

Coupler straps 34 are positioned along at least one side of bag 10 and are secured by stitching. Each coupler strap 34 forms a loop substantially the same as the loops formed by strap 26.

In use, bag 10 is loaded with an insecticide cartridge 23 and compartment 16 is closed. Bag 10 is hung from an overhead structure such as tree limb 14 using the free end stretches of tie ropes 28 and 30 with bag 10 so positioned that an animal 12 may walk in the pathway of the bag to distribute powdered insecticide over its body. This is a "free choice" application which is particularly effective around water tanks, mineral feeders and salt feeders. Tie ropes 28 and 30, because they are joined to the bag at one side and then pass through tubular support 24 in opposite directions keep the bag from "bunching up" or otherwise distorting in a way which would impair distribution of insecticide.

Figure 4:
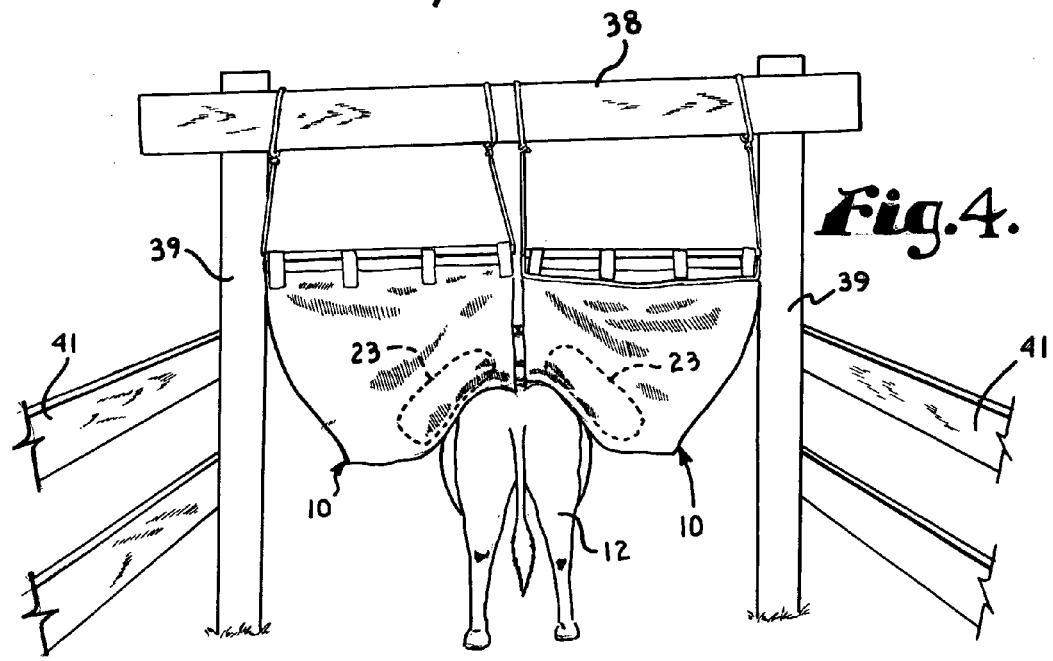
FIG. 4 is an elevational view illustrating how two dust bags constructed according to the present invention may be coupled together to block an area that would be too wide for a single bag and thus achieving a "forced use" application.

An alternative embodiment of the invention is shown FIG. 4 where two bags 10 are hung from an overhead support 38 in side by side relationship. Support 38 is positioned between and secured to two spaced uprights 39 within a walkway defined by spaced fence sections 41. Coupler straps 34 are used to join the two bags together in close relationship. It will be appreciated that a short length of rope 35 (FIG. 3) may be passed through adjoining couplers to complete the connection between two bags. By coupling the bags in close side by side relationship there is not sufficient room between the bags to allow an animal 12 to pass without being fully exposed to the action of applicator bags 10. This arrangement addresses a problem in the prior art for forced use applications of insecticide, one of the most common technique in the industry. In forced use applications when insecticide bags are placed in a confined walkway for cattle, side by side bags are often "parted" as an animal walks through the gap between the two bags and the dose of insecticide upon such contact is less than desirable. This problem is avoided with the present invention as a result of the novel tie arrangement discussed above for the individual bags in combination with the couplers which join two bags together. It will be appreciated that coupler straps 34 could be placed on both sides of a bag 10 so that three or more bags can be joined in side by side relationship. Another advantage of the present invention when applied to forced use applications is that when animals approach the light between two side by side bags the cartridge 23 will be lifted at approximately 45° angles into the positions illustrated in FIG. 4 as the animal passes beneath. The bags are hung twelve to eighteen inches below the backline of the animal to insure this lifting action. When the animal emerges from beneath the bags the cartridges will fall back to horizontal positions thereby increasing the amount of insecticide applied to this animal and any animal following in close proximity.

The invention is equally applicable to bags of different configurations such as triangular or trapezoidal. With non-right angle polygons, such as triangles, it will be desirable to utilize a panel to fill in the open space when tying two bags together.

The present invention also encompasses a method of securing a dust bag for the application of insecticide to animals where an overhead structure is utilized which includes the steps of providing a bag for holding a quantity of powdered insecticide, securing a first tie rope to one side of the bag and securing a second tie rope to the other side of the bag. A tubular support is provided which extends across the top of the bag and the bag is coupled to the tubular support. A further step is passing the first tie rope through the tubular support in one direction and leaving a length of the first tie rope extending from the end. Still another step is passing the second tie rope through the tubular support in the opposite direction and leaving a length of the second rope extending from the end of the support. The two free ends of the first and second tie ropes which extend from the tubular support are then utilized to hang the bag from an overhead structure. Preferably, the first and second tie ropes are one continuous length and the method includes securing that portion of the rope which extends between the two sides to the bag with a tie stretch which forms the continuous rope. The method may also be utilized with two or more bags in side by side relationship by the simple additional step of tying one bag with the next adjacent bag.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. An animal insecticide applicator comprising:
   a bag for holding a quantity of insecticide, said bag having a top, two sides and a bottom;
   a rigid tubular support coupled with and extending across the top of said bag;
   a first tie rope secured to and extending at least partially along a first side of said bag and extending through the length of said tubular support in one direction, a length of said rope hanging free at a second side of said bag for use in hanging said bag from an overhead support; and
   a second tie rope secured to and extending at least partially along said second side of said bag and passing through the length of said tubular support in the opposite direction of said first tie rope, a length of said second rope hanging free at said first side of said bag for use in hanging said bag from an overhead support.

2. The invention of claim 1 wherein each of said tie ropes is stitched to one of the sides of said bag.

3. The invention of claim 1 wherein said first and second tie ropes comprise one continuous length of rope which includes a length extending across said bag at the point where said first and second ropes are joined to the sides of the bag.

4. The invention of claim 1 wherein said bag includes a coupler along one side for joining said bag to another bag in side by side relationship.

5. The invention of claim 1 wherein said bag includes a plurality of straps along the top of the bag through which said rigid tubular member is inserted.

6. A method of securing a dust bag for the application of insecticide to animals, utilizing an overhead structure said method comprising:
   providing a bag for holding a quantity of insecticide in powder form;
   securing a first tie rope to one side of said bag;
   securing a second tie rope to the other side of said bag;
   providing a tubular support extending substantially across the top of said bag;
   coupling said bag to said tubular support;
   passing said first tie rope through the length of said tubular support in one direction and leaving a length of said first rope extending from the end of said support;
   passing said second tie rope through the length of said tubular support in the opposite direction and leaving a length of said second rope extending from the opposite end of said support; utilizing said lengths of said first and second tie ropes which extend from the ends of said support to having said bag from said overhead structure.

7. A method as set forth in claim 6, wherein said first and second tie ropes are one continuous length of rope and including the step of securing that portion of said rope extending between said sides to said bag.

8. A method as set forth in claim 7, wherein said securing steps comprise sewing said tie ropes to said bag.

9. A method as set forth in claim 7, wherein is included the step of joining said bag to a second identical bag in side by side relationship.

\* \* \* \* \*